US008567193B2

(12) United States Patent
Terashima et al.

(10) Patent No.: US 8,567,193 B2
(45) Date of Patent: Oct. 29, 2013

(54) WASTE HEAT RECOVERING DEVICE (75) Inventors: Koji Terashima, Fujisawa (JP); Makoto Abe, Fujisawa (JP); Yasushi Yamamoto, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 451 days.

(21) Appl. No.: 12/934,114

(22) PCT Filed: Feb. 17, 2009

(86) PCT No.: PCT/JP2009/052673
§ 371 (c)(1),
(2), (4) Date: Sep. 23, 2010

(87) PCT Pub. No.: WO2009/119185
PCT Pub. Date: Oct. 1, 2009

(65) Prior Publication Data
US 2011/0005477 A1 Jan. 13, 2011

(30) Foreign Application Priority Data
Mar. 27, 2008 (JP) .................................. 2008-083483

(51) Int. Cl.
F02G 3/00 (2006.01)
F01N 3/02 (2006.01)
F01N 5/02 (2006.01)
F01K 9/00 (2006.01)

(52) U.S. Cl.
USPC .................... 60/618; 60/616; 60/320; 60/661

(58) Field of Classification Search
USPC ........ 60/516–526, 614–624, 641.8, 645–681; 165/294, 296, 297
See application file for complete search history.

(56) References Cited

U.S. PATENT DOCUMENTS 4,031,705 A * 6/1977 Berg ............................... 60/615
4,276,747 A * 7/1981 Faldella et al. .................. 60/618
(Continued)

FOREIGN PATENT DOCUMENTS

EP 0 263 005 A1 4/1988
JP 63-147549 A 6/1988
(Continued)

OTHER PUBLICATIONS

PCT Search Report for Serial No. PCT/JP2009/052673 dated May 13, 2009. (4 pages).

Primary Examiner — Kenneth Bomberg
Assistant Examiner — Christopher Jetton
(74) Attorney, Agent, or Firm — McCormick, Paulding & Huber LLP (57) ABSTRACT

The present invention provides a waste heat recovering device capable of recovering waste heat with good efficiency from various heat sources in an internal combustion engine. The waste heat recovering device for driving an expander 14 by evaporating a working fluid by waste heat of an internal combustion engine 11 includes: a working fluid circulation flow path 15 in which the working fluid of the expander 14 is caused to circulate; a high-temperature heat exchanger 12 for heating the working fluid flowing in the working fluid circulation flow path 15 by a high-temperature fluid such as exhaust gas of the internal combustion engine 11; a low-temperature heat exchanger group 16 having, for each of low-temperature fluids such as cooling water and oil of the internal combustion engine 11, a low-temperature heat exchanger 13a, 13b for heating the working fluid flowing in the working fluid circulation flow path 15 by any one of the low-temperature fluids, the low-temperature heat exchangers 13a, 13b being disposed in parallel with each other; a flow rate control valve 17 that controls a flow rate of the working fluid flowing into each low-temperature heat exchanger 13a, 13b of the low-temperature heat exchanger group 16; and control means 18 for controlling the flow rate control valve 17.

4 Claims, 7 Drawing Sheets

(56) References Cited

U.S. PATENT DOCUMENTS

| | | | |
|---|---|---|---|
| 4,601,328 A * | 7/1986 | Tasaka et al. | 165/294 |
| 7,866,157 B2 * | 1/2011 | Ernst et al. | 60/618 |
| 2009/0000299 A1 * | 1/2009 | Ast et al. | 60/618 |

FOREIGN PATENT DOCUMENTS

| | | | |
|---|---|---|---|
| JP | 01-267306 A | | 10/1989 |
| JP | 03-237256 A | | 10/1991 |
| JP | 04-005461 A | | 1/1992 |
| JP | 08-246953 A | | 9/1996 |
| JP | 2003-247750 A | | 9/2003 |
| JP | 2004-257601 A | | 9/2004 |
| JP | 2005-273543 A | | 10/2005 |
| JP | 2005273543 A | * | 10/2005 |
| JP | 2007-211681 A | | 8/2007 |
| JP | 2008-038916 A | | 2/2008 |

* cited by examiner

WASTE HEAT RECOVERING DEVICE

CROSS REFERENCE TO RELATED APPLICATIONS

This application is entitled to the benefit of and incorporates by reference essential subject matter disclosed in International Patent Application No. PCT/JP2009/052673 filed on Feb. 17, 2009 and Japanese Patent Application No. 2008-083483 filed Mar. 27, 2008.

TECHNICAL FIELD

The present invention relates to a waste heat recovering device for driving an expander by evaporating a working fluid by waste heat of an internal combustion engine.

BACKGROUND ART

A composite cycle in which an internal combustion engine is combined with an external combustion engine to use effectively the waste heat of the internal combustion engine has been widely employed in power generation facilities (see Japanese Patent Application Publication No. 2004-257601 and Japanese Patent Application Publication No. S63-147549). Recently an attempt has also been made to use such a cycle in an internal combustion engine of a vehicle.

DISCLOSURE OF THE INVENTION

However, heat of exhaust gas of an internal combustion engine that is used as the main heat source is also used as energy for activating a catalyst of a subsequent stage, and where the heat is excessively recovered from the exhaust gas, the catalyst cannot function effectively. Further, in addition to exhaust gas, an internal combustion engine installed on a vehicle also has heat sources of various temperatures (cooling water or oil of the internal combustion engine), and heat is difficult to recover completely from these heat sources with a simple system. In addition, with some heat sources, the excessive heat recovery can adversely affect the operation of the internal combustion engine.

Accordingly, it is an object of the present invention to provide a waste heat recovering device capable of recovering waste heat with good efficiency from various heat sources in an internal combustion engine.

In order to attain the above-described object, the present invention provides a waste heat recovering device for driving an expander by evaporating a working fluid by waste heat of an internal combustion engine, including: a working fluid circulation flow path in which the working fluid of the expander is caused to circulate; a high-temperature heat exchanger for heating the working fluid flowing in the working fluid circulation flow path by a high-temperature fluid such as exhaust gas of the internal combustion engine; a low-temperature heat exchanger group having, for each of low-temperature fluids such as cooling water and oil of the internal combustion engine, a low-temperature heat exchanger for heating the working fluid flowing in the working fluid circulation flow path by any one of the low-temperature fluids, the low-temperature heat exchangers being disposed in parallel with each other; a flow rate control valve that controls a flow rate of the working fluid flowing into each low-temperature heat exchanger of the low-temperature heat exchanger group; and control means for controlling the flow rate control valve.

Here, the low-temperature heat exchanger group may be installed in the working fluid circulation flow path on a working fluid upstream side of the high-temperature heat exchanger.

Further, there may be provided a first bypass flow path that branches off the working fluid circulation flow path and bypasses the low-temperature heat exchanger group, and a first bypass valve that is selectively switched between a position in which the working fluid is caused to flow in the low-temperature heat exchanger group and a position in which the working fluid is caused to flow in the first bypass flow path.

Here, there may be provided a second bypass flow path that branches off the working fluid circulation flow path and bypasses the high-temperature heat exchanger, and a second bypass valve that is selectively switched between a position in which the working fluid is caused to flow in the high-temperature heat exchanger and a position in which the working fluid is caused to flow in the second bypass flow path.

Here, each low-temperature heat exchanger of the low-temperature heat exchanger group may heat the working fluid flowing in the working fluid circulation flow path by a fluid at approximately the same temperature.

The present invention demonstrates an excellent effect of enabling efficient recovery of waste heat from various heat sources in an internal combustion engine.

BEST MODE FOR CARRYING OUT THE INVENTION

The preferred embodiment of the present invention will be described below in greater detail with reference to the appended drawings.

Figure 1:
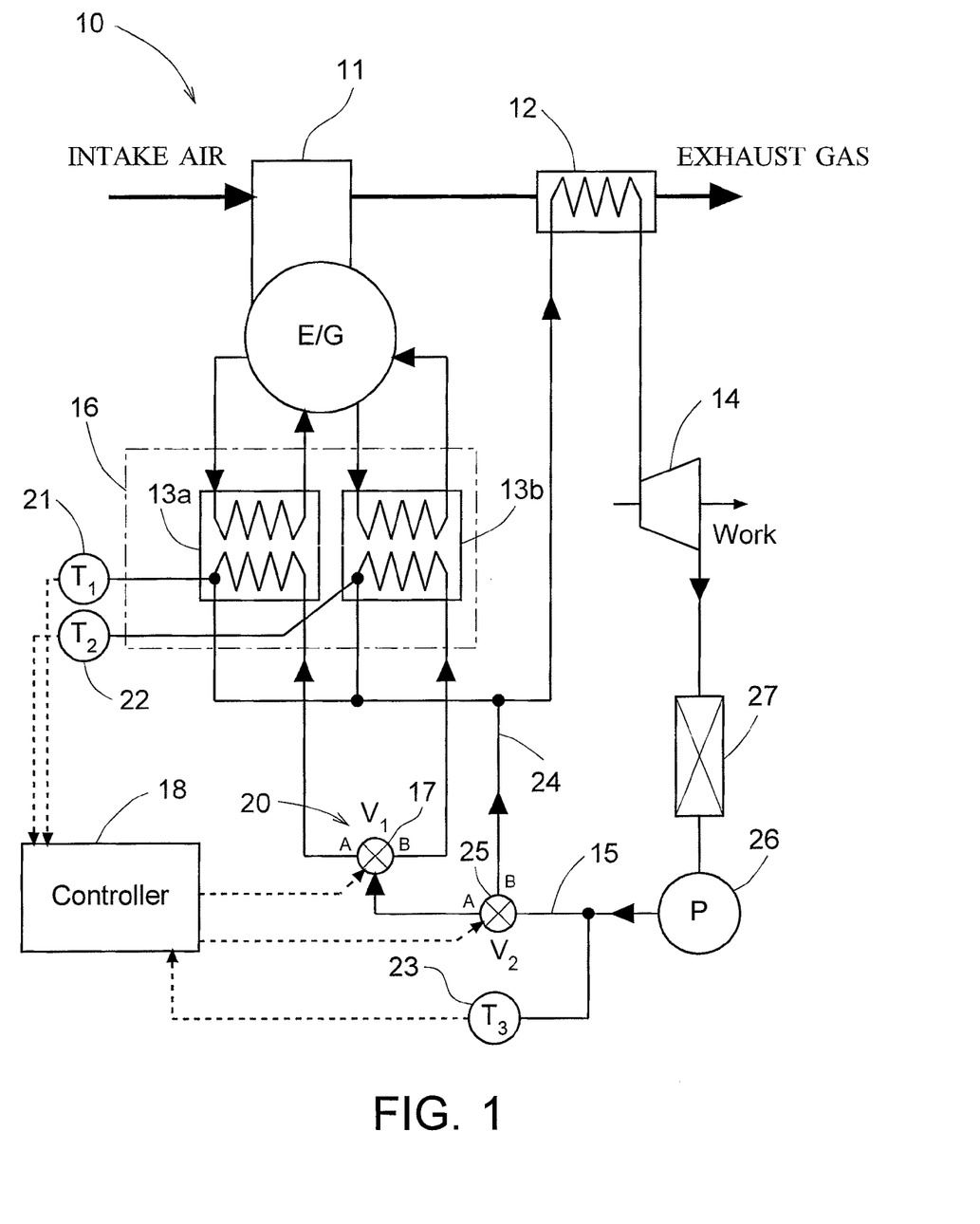
FIG. 1 is a schematic drawing illustrating a waste heat recovering device of one embodiment of the present invention.

As shown in FIG. 1, a waste heat recovering device 10 according to the present embodiment serves to recover waste heat of an internal combustion engine (diesel engine and the like) 11 installed on a vehicle. The waste heat recovering device is provided with an expander 14 driven by steam generated by the below-described high-temperature heat exchanger 12 and low-temperature heat exchangers 13a, 13b. A generator (not shown in the figure) is actuated by the expander 14, and the electric power generated by the generator is consumed for driving various devices by the below-described controller 18 and accumulated by a battery.

The waste heat recovering device 10 of the present embodiment includes a working fluid circulation flow path 15 in which the working fluid of the expander 14 is caused to circulate, a high-temperature heat exchanger 12 for heating the working fluid flowing in the working fluid circulation flow path 15 by a high-temperature fluid, a low-temperature heat exchanger group 16 having, for each low-temperature fluid, a low-temperature heat exchanger 13a, 13b for heating the working fluid flowing in the working fluid circulation flow path 15 by any one of the low-temperature fluids, the low-temperature heat exchangers 13a, 13b being disposed in parallel with each other, a flow rate control valve 17 that controls a flow rate of the working fluid flowing into each low-temperature heat exchanger 13a, 13b of the low-temperature heat exchanger group 16, and control means (controller) for controlling the flow rate control valve 17.

In the present embodiment, the low-temperature heat exchanger group 16 (low-temperature heat exchangers 13a, 13b) is installed in the working fluid circulation flow path 15 on the working fluid upstream side of the high-temperature heat exchanger 12. By so disposing the low-temperature heat exchangers 13a, 13b and the high-temperature heat exchanger 12, it is possible to increase the recovery efficiency of waste heat by further heating with the high-temperature fluid the working fluid that has been heated by the low-temperature fluid.

In the present embodiment, various heat sources (fluids) in the internal combustion engine 11 are divided (grouped) into low-temperature fluids and high-temperature fluids on the basis the temperature (release temperature) of these heat sources and the target cooling temperature.

Examples of heat sources in the internal combustion engine 11 include exhaust gas (release temperature: 300° C. to 400° C., target cooling temperature: not specified) from the internal combustion engine 11, cooling water (release temperature: approximately 80° C., target cooling temperature: approximately 60° C.) of the internal combustion engine 11, oils (engine oil, power steering oil, transmission oil, and the like) (release temperature: approximately 80° C., target cooling temperature: approximately 60° C.) of the internal combustion engine 11, and intake air (release temperature: approximately 120° C., target cooling temperature: as low as possible) pressurized by a turbocharger compressor.

Figure 6:
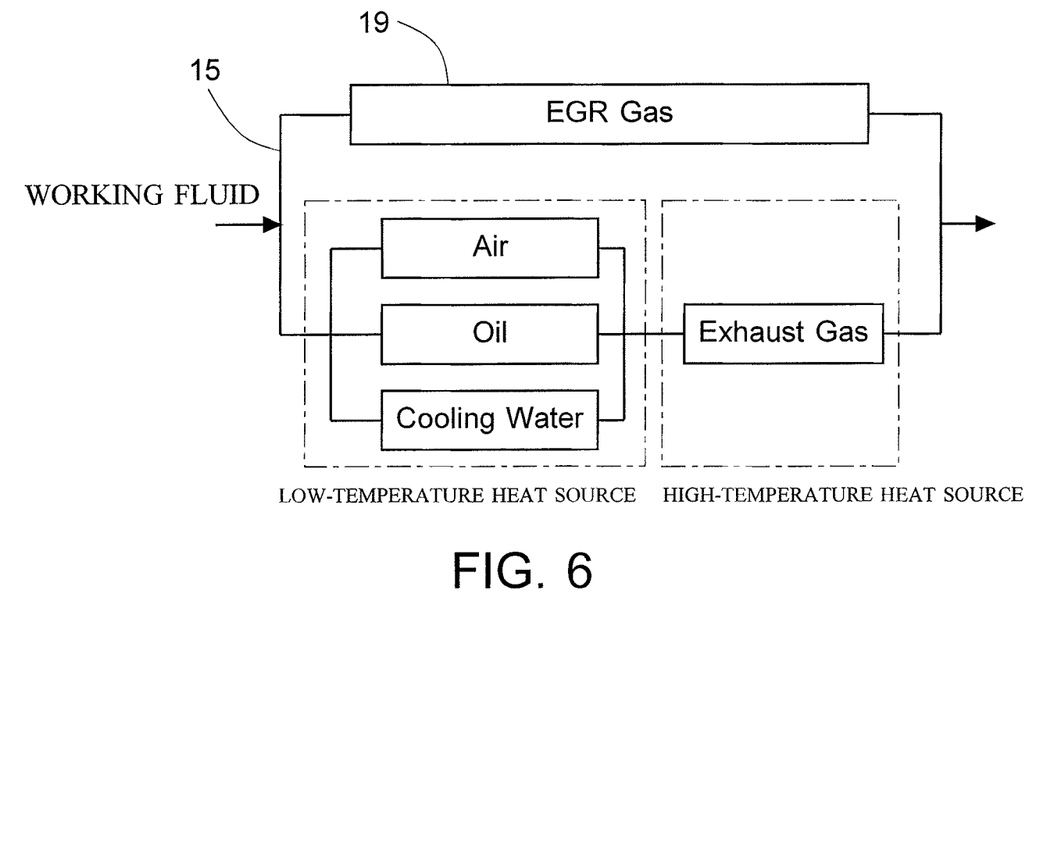
FIG. 6 shows an example of heat exchanger arrangement.
Figure 7:
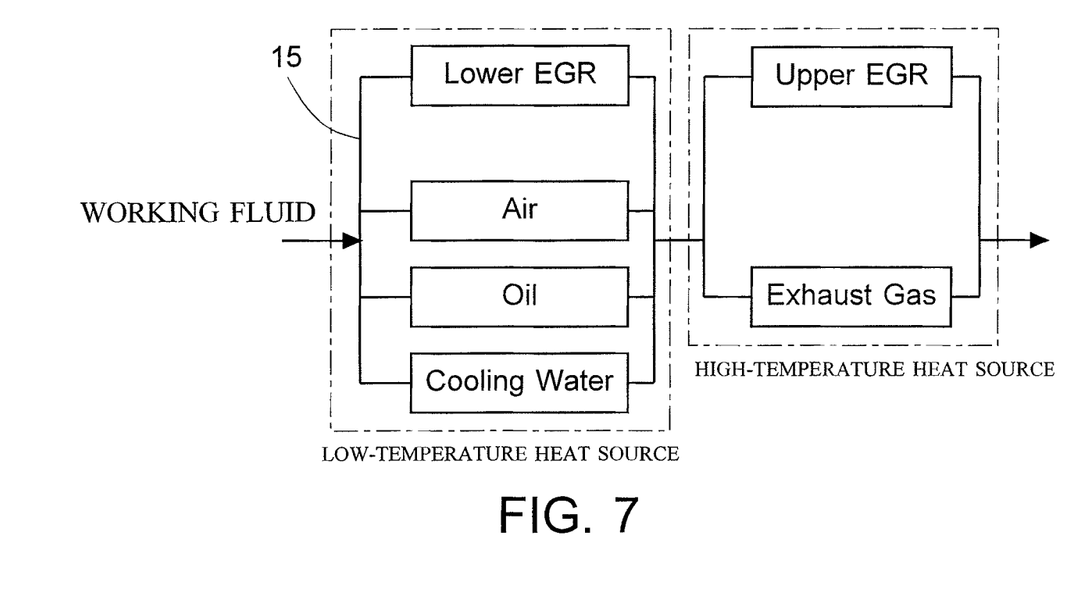
FIG. 7 shows an example of heat exchanger arrangement.

Fluids (cooling water, oil, intake air, and the like), other than the exhaust gas, have no significant difference in temperature. In other words, each fluids (cooling water, oil, intake air, and the like), other than the exhaust gas, have almost the same temperature and the temperature thereof is lower than that of the exhaust gas. Therefore, in the present embodiment, these cooling water, oil, intake air, and the like are classified as low-temperature fluids and flow in parallel to each other in the low-temperature heat exchangers 13a, 13b (see FIG. 6 and FIG. 7). In other words, in the present embodiment, the low-temperature heat exchangers 13a, 13b heat the working fluid flowing in the working fluid circulation flow path 15 by the cooling water, oil, intake air, and the like.

The exhaust gas temperature is higher than that of the cooling water, oil, intake air, and the like. Accordingly, in the present embodiment, the exhaust gas is classified as a high-temperature fluid and flows in the high-temperature heat exchanger 12 (see FIG. 6 and FIG. 7). In other words, in the present embodiment, the high-temperature heat exchanger 12 heats the working fluid flowing in the working fluid circulation flow path 15 by the exhaust gas.

The EGR gas (release temperature: 300° C. to 400° C., target cooling temperature: as low as possible) has a temperature higher than that of the cooling water, oil, intake air, and the like, but almost equal to that of the exhaust gas. However, the target cooling temperature of the EGR gas is lower than the target cooling temperature of the exhaust gas and almost equal to the target cooling temperature of the cooling water, oil, intake air, and the like. Accordingly, a heat exchanger 19 is disposed in parallel with the low-temperature heat exchangers 13a, 13b and the high-temperature heat exchanger 12 in the working fluid circulation flow path 15 and heat from the EGR gas is assumed to be recovered by the working fluid in the heat exchanger 19 (see FIG. 6). Further, the heat can be also assumed to be recovered from the EGR gas in two stages, the EGR gas on the gas downstream side being classified as a low-temperature fluid and the EGR gas on the gas upstream side being classified as a high-temperature fluid (see FIG. 7). When a plurality of high-temperature fluids are set, a plurality of high-temperature heat exchangers 12 are arranged in parallel with each other in the working fluid circulation flow path 15 and a high-temperature heat exchanger group is constituted by these high-temperature heat exchangers 12.

A flow rate control valve 17 is installed in a branching point 20 of the working fluid circulation flow path 15 linked to the low-temperature heat exchangers 13a, 13b disposed parallel to each other. A directional flow rate control valve or a valve similar thereto can be used as the flow rate control valve 17.

First temperature sensors 21, 22 that detect the working fluid outlet temperature of the low-temperature heat exchangers 13a, 13b of the low-temperature heat exchanger group 16 and a second temperature sensor 23 that detects the working fluid temperature on the upstream side of the low-temperature heat exchanger group 16 are provided in the working fluid circulation flow path 15.

Further, the waste heat recovering device 10 according to the present embodiment also includes a first bypass flow path 24 that branches off the working fluid circulation flow path 15 and bypasses the low-temperature heat exchanger group 16 and a first bypass valve 25 that is selectively switched between a position in which the working fluid is caused to flow in the low-temperature heat exchanger group 16 and a position in which the working fluid is caused to flow in the first bypass flow path 24. A switching valve is used as the first bypass valve 25.

The working fluid is supplied by a pump 26 to the low-temperature heat exchangers 13a, 13b and the high-temperature heat exchanger 12. The working fluid that has driven the expander 14 is cooled by a running air flow in a condenser 27, supplied to the pump 26, and circulated by the pump 26.

Valve control performed by the controller 18 will be explained below with reference to FIG. 2.

Figure 2:
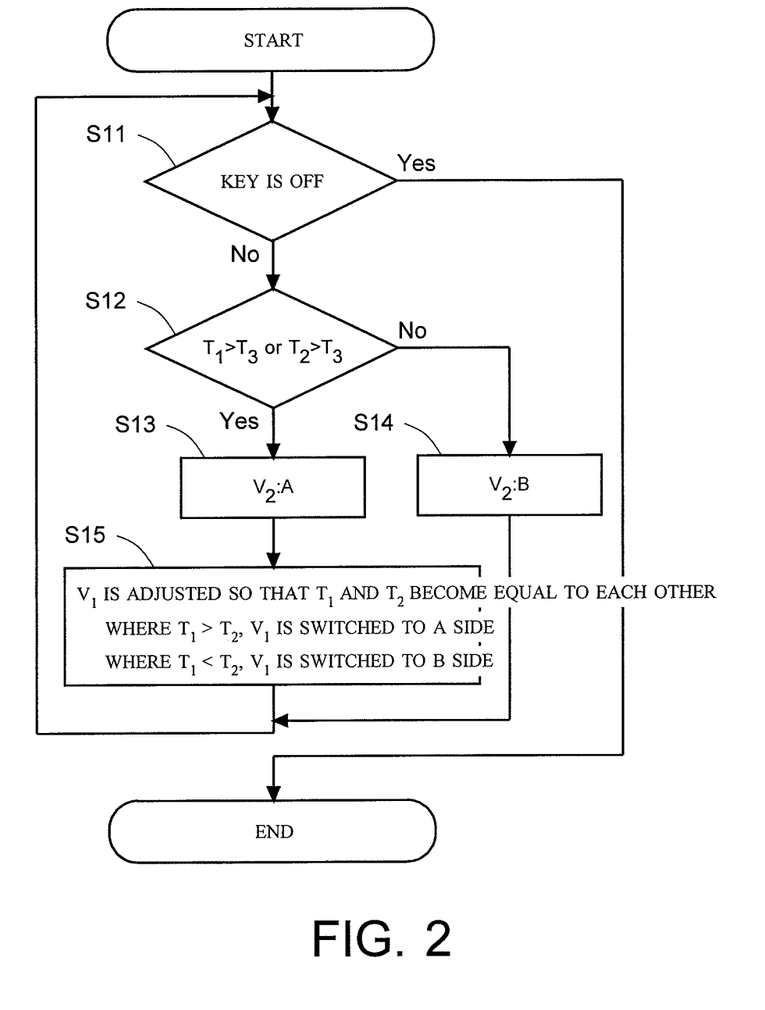
FIG. 2 is a flowchart illustrating valve control.

The processing flow shown in FIG. 2 is executed when an ignition key is not OFF (S11 in FIG. 2), that is, when the internal combustion engine 11 operates.

In the processing flow shown in FIG. 2, when the working fluid outlet temperatures $T_1$, $T_2$ of the low-temperature heat exchangers 13a, 13b detected by the first temperature sensors 21, 22 are higher than the temperature $T_3$ of the working fluid on the upstream side of the low-temperature heat exchanger group 16 detected by the second temperature sensor 23 (S12 in FIG. 2; $T_1 > T_3$ or $T_2 > T_3$), the controller 18 switches the first bypass valve 25 to the A side of the low-temperature heat exchanger group 16 (S13 in FIG. 2), supplies the working fluid to the low-temperature heat exchangers 13a, 13b of the low-temperature heat exchanger group 16, and adjusts the opening degree of the flow rate control valve 17 so that the working fluid outlet temperatures $T_1$, $T_2$ of the low-temperature heat exchangers 13a, 13b become equal to each other (S15 in FIG. 2). As a result, even when heat amounts exchanged by the low-temperature heat exchangers 13a, 13b of the low-temperature heat exchanger group 16 are somewhat different, the flow rate of the working fluid flowing to the low-temperature heat exchangers 13a, 13b of the low-temperature heat exchanger group 16 is controlled by the flow rate control valve 17 and the working fluid outlet temperatures $T_1$, $T_2$ of the low-temperature heat exchangers 13a, 13b become equal to each other, thereby making it possible to recover a larger amount of heat and recover waste heat with good efficiency.

When the working fluid outlet temperatures $T_1$, $T_2$ of the low-temperature heat exchangers 13a, 13b detected by the first temperature sensors 21, 22 are equal to or lower than the temperature $T_3$ of the working fluid on the upstream side of the low-temperature heat exchanger group 16 detected by the second temperature sensor 23, the controller 18 switches the first bypass valve 25 to the B side of the first bypass flow path 24 (S14 in FIG. 2) and causes the working fluid to circulate by bypassing the low-temperature heat exchanger group 16 (low-temperature heat exchangers 13a, 13b). As a result, the working fluid can be prevented from being cooled by a low-temperature heat source such as cooling water when the engine is started and the occurrence of heat loss can be avoided.

Figure 3:
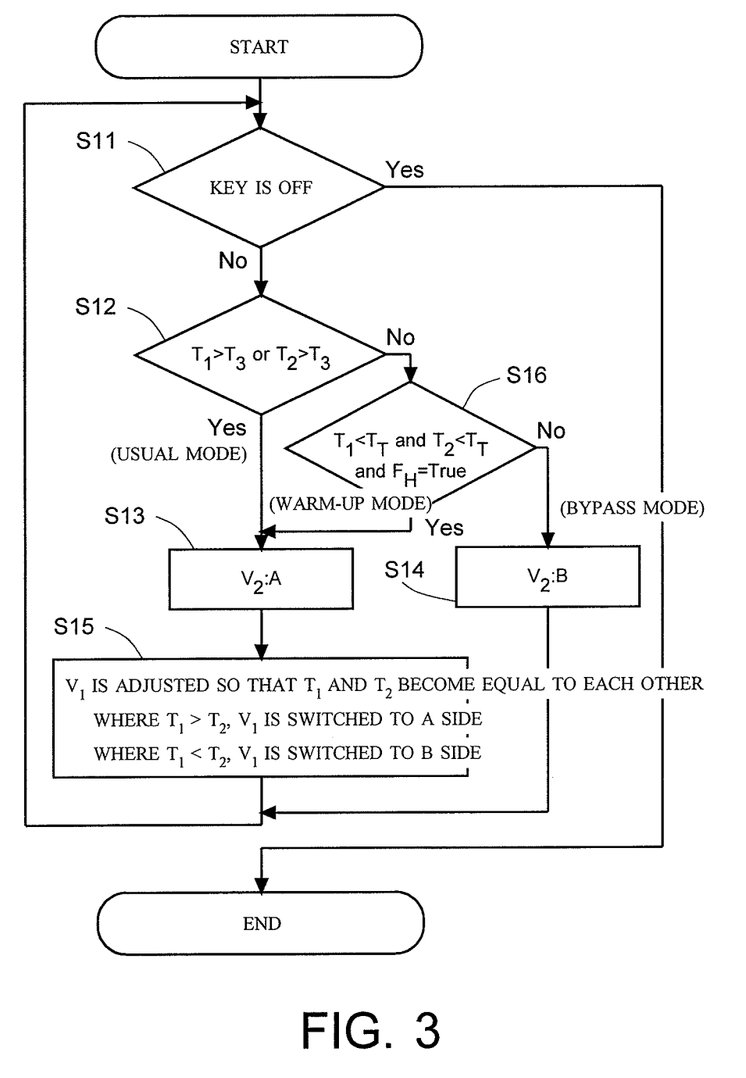
FIG. 3 is a flowchart illustrating valve control provided with a warm-up shortening function.

In the processing flow shown in FIG. 3, a warm-up shortening function is added to the processing flow shown in FIG. 2.

In the processing flow shown in FIG. 3, even when the working fluid outlet temperatures $T_1$, $T_2$ of the low-temperature heat exchangers 13a, 13b detected by the first temperature sensors 21, 22 are equal to or lower than the temperature $T_3$ of the working fluid on the upstream side of the low-temperature heat exchanger group 16 detected by the second temperature sensor 23, where the working fluid outlet temperatures $T_1$, $T_2$ of the low-temperature heat exchangers 13a, 13b detected by the first temperature sensors 21, 22 are lower than a predetermined target lower limit temperature $T_T$ of the low-temperature heat exchanger (S16 in FIG. 3; $T_1<T_T$ and $T_2<T_T$) and a warm-up mode allowed flag is true ($F_H$=True), the controller 18 switches the first bypass valve 25 to the A side of the low-temperature heat exchanger group 16 (S13 in FIG. 3) and supplies the working fluid to the low-temperature heat exchangers 13a, 13b of the low-temperature heat exchanger group 16. As a result, the time required for warm-up operation can be shortened by canceling the bypass when the temperature of a low-temperature heat source such as cooling water is lower than a predetermined value, for example, when the engine is started, and heating the cooling water with the working fluid.

A special switch that can switch the warm-up mode allowed flag, so that the driver can select whether to allow the warm-up mode, can be disposed in a meter unit of a driver seat. A means for switching the warm-up mode allowed flag is not limited to the aforementioned special switch.

A waste heat recovering device 10 according to another embodiment will be explained below with reference to FIG. 4.

Figure 4:
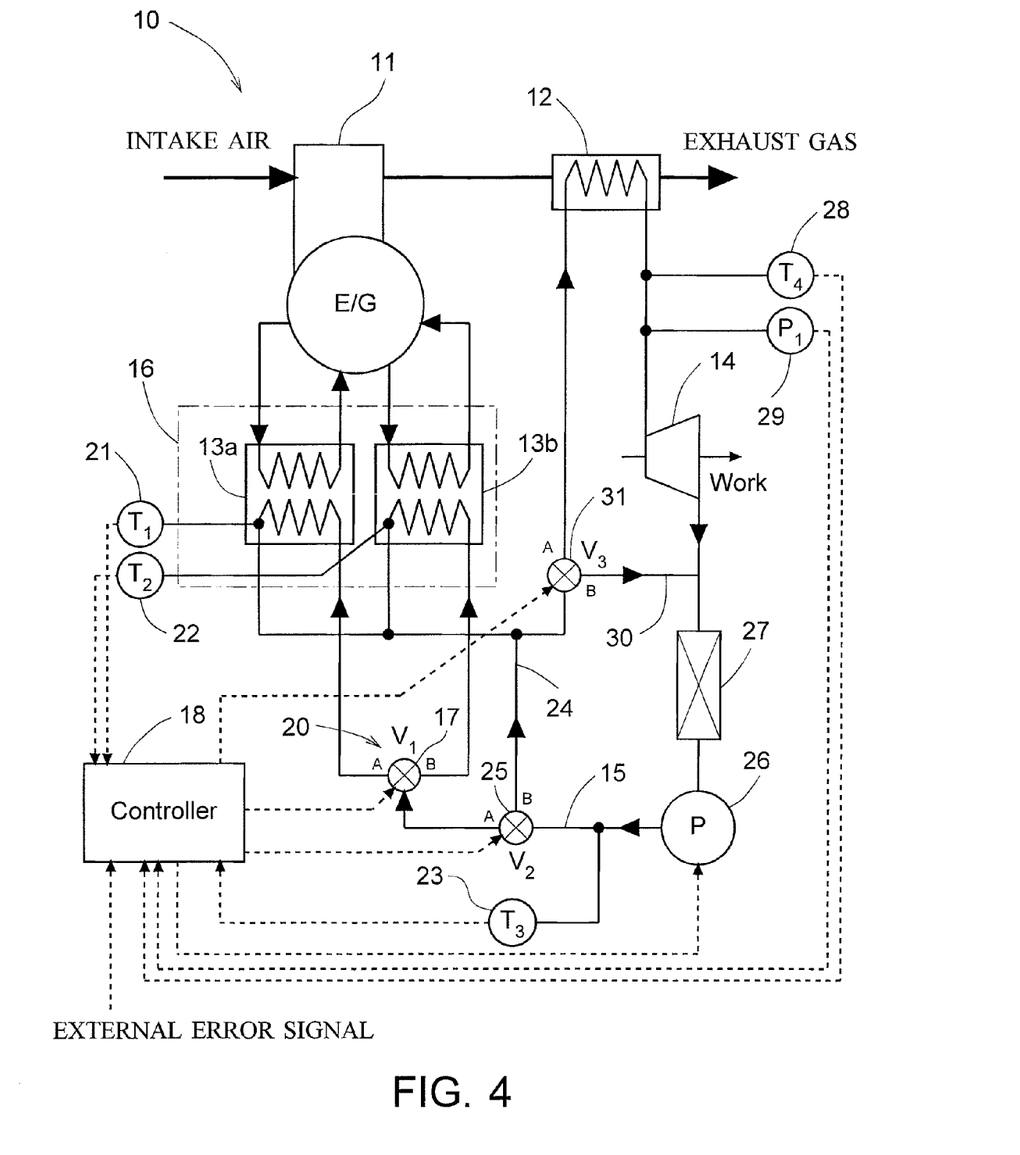
FIG. 4 is a schematic drawing of a waste heat recovering device of another embodiment.

FIG. 4 is a schematic drawing of a waste heat recovering device according to another embodiment. Components identical to those shown in FIG. 1 are assigned with same reference symbols and explanation thereof is herein omitted.

A second temperature sensor 28 that detects a working fluid outlet temperature of the high-temperature heat exchanger 12 and a pressure sensor 29 that detects a working fluid outlet pressure of the high-temperature heat exchanger 12 are provided in the working fluid circulation flow path 15.

The waste heat recovering device 10 according to the present embodiment includes a second bypass flow path 30 that branches off the working fluid circulation flow path 15 and bypasses the high-temperature heat exchanger 12 and the expander 14 and a second bypass valve 31 that is selectively switched between a position in which the working fluid is caused to flow in the high-temperature heat exchanger 12 and a position in which the working fluid is caused to flow in the second bypass flow path 30. A directional flow rate control valve or a valve similar thereto can be used as the second bypass valve 31.

Valve control performed by the controller 18 will be explained with reference to FIG. 5. Only the difference between this control and the processing flow shown in FIG. 3 will be explained.

Figure 5:
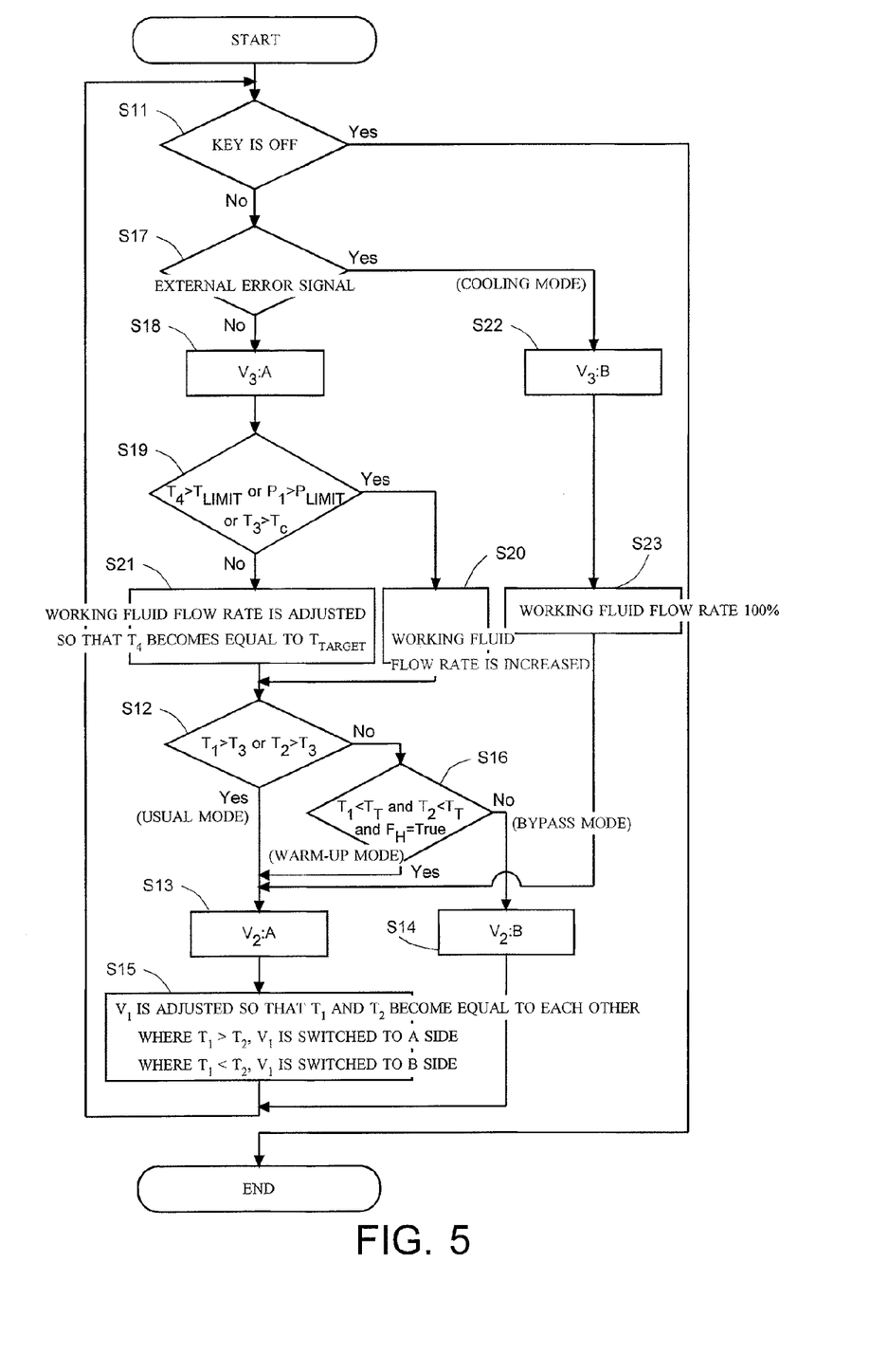
FIG. 5 is a flowchart illustrating valve control.

In the processing flow shown in FIG. 5, when an external error signal indicating the occurrence of overheating in the internal combustion engine 11 is not inputted (S17 in FIG. 5), the controller 18 switches the second bypass valve 31 to the A side of the high-temperature heat exchanger 12 (S18 in FIG. 5) and supplies the working fluid to the high-temperature heat exchanger 12.

When a working fluid outlet temperature T4 of the high-temperature heat exchanger 12 detected by the second temperature sensor 28 is higher than a predetermined allowed maximum temperature $T_{LIMIT}$ ($T_4 > T_{LIMIT}$), or when a working fluid outlet pressure $P_1$ of the high-temperature heat exchanger 12 detected by the pressure sensor 29 is higher than a predetermined allowed maximum pressure $P_{LIMIT}$ ($P_1 > P_{LIMIT}$), or when a temperature $T_3$ of the working fluid on the upstream side of the low-temperature heat exchanger group 16 detected by the second temperature sensor 23 is higher than a predetermined target temperature $T_C$ ($T_3 > T_C$) (S19 in FIG. 5), the controller 18 adjusts the opening degree of the second bypass valve 31 so as to increase the flow rate of the working fluid flowing in the high-temperature heat exchanger 12 (S20 in FIG. 5). As a result damage of the high-temperature heat exchanger 12 and the like can be prevented. When the conditions shown in S24 in FIG. 5 are not fulfilled, the controller 18 adjusts the opening degree of the second bypass valve 31 so that a working fluid outlet temperature $T_4$ of the high-temperature heat exchanger 12 becomes a predetermined maximum temperature target value $T_{TARGET}$ (S21 in FIG. 5). As a result, a larger amount of heat can be recovered and waste heat can be recovered with good efficiency.

When the external error signal indicating the occurrence of overheating in the internal combustion engine 11 is inputted (S17 in FIG. 5), the controller 18 switches the second bypass valve 31 to the B side of the second bypass flow path 30 (S22, S23 in FIG. 5) and causes the working fluid to circulate by bypassing the high-temperature heat exchanger 12 and the expander 14. As a result, heat recovery from the high-temperature fluid such as exhaust gas is stopped and circulation velocity of the working fluid is increased, thereby making it possible to cool efficiently the cooling water or the like in the low-temperature heat exchangers 13a, 13b by the low-temperature working fluid.

The preferred embodiments of the present invention are explained above, but the present invention is not limited to these embodiments and a variety of other embodiments can be employed.

What is claimed is:

1. A waste heat recovering device for driving an expander by evaporating a working fluid by waste heat of an internal combustion engine, comprising:
   a working fluid circulation flow path in which the working fluid of the expander is caused to circulate;
   a high-temperature heat exchanger for heating the working fluid flowing in the working fluid circulation flow path by a high-temperature fluid of the internal combustion engine;
   a low-temperature heat exchanger group having, for each of low-temperature fluids of the internal combustion engine, a low-temperature heat exchanger for heating the working fluid flowing in the working fluid circulation flow path by any one of the low-temperature fluids, the low-temperature heat exchangers being disposed in parallel with each other;

a flow rate control valve that controls a flow rate of the working fluid flowing into each low-temperature heat exchanger of the low-temperature heat exchanger group;

a first bypass flow path that branches off the working fluid circulation flow path and bypasses the low-temperature heat exchanger group;

a first bypass valve that is selectively switched between a position in which the working fluid is caused to flow in the low-temperature heat exchanger group and a position in which the working fluid is caused to flow in the first bypass flow path;

first temperature sensors that detect the working fluid outlet temperature of each low-temperature heat exchanger;

a second temperature sensor that detects the working fluid temperature on the upstream side of the low-temperature heat exchanger group; and a controller for controlling the flow rate control valve and the first bypass valve;

wherein when at least one of the working fluid temperatures detected by the first temperature sensors is higher than the working fluid temperature detected by the second temperature sensor, the controller switches the first bypass valve to the position in which the working fluid is caused to flow in the low-temperature heat exchanger group, and adjusts the flow rate of the working fluid flowing to each low-temperature heat exchanger by the flow rate control valve so that the working fluid outlet temperatures of each low-temperature heat exchanger detected by the first temperature sensors become equal to each other; and wherein when at least one of the working fluid temperatures detected by the first temperature sensors is equal to or lower than the working fluid temperature detected by the second temperature sensor, the controller switches the first bypass valve to the position in which the working fluid is caused to flow in the first bypass flow path.

2. The waste heat recovering device according to claim 1, wherein the low-temperature heat exchanger group is installed in the working fluid circulation flow path on a working fluid upstream side of the high-temperature heat exchanger.

3. The waste heat recovering device according to claim 1, comprising a second bypass flow path that branches off the working fluid circulation flow path and bypasses the high-temperature heat exchanger, and a second bypass valve that is selectively switched between a position in which the working fluid is caused to flow in the high-temperature heat exchanger and a position in which the working fluid is caused to flow in the second bypass flow path.

4. The waste heat recovering device according to claim 1, wherein each low-temperature heat exchanger of the low-temperature heat exchanger group heats the working fluid flowing in the working fluid circulation flow path by a fluid at approximately the same temperature.

* * * * *